US012482281B2

(12) United States Patent
Kim et al.

(10) Patent No.: US 12,482,281 B2
(45) Date of Patent: Nov. 25, 2025

(54) CELL SELECTION APPARATUS AND METHOD

(71) Applicants: THE CATHOLIC UNIVERSITY OF KOREA INDUSTRY-ACADEMIC COOPERATION FOUNDATION, Seoul (KR); POSTECH RESEARCH AND BUSINESS DEVELOPMENT FOUNDATION, Pohang-si (KR)

(72) Inventors: Do Hyun Kim, Seoul (KR); Sung Won Kim, Seoul (KR); Seung Ki Kwok, Seoul (KR); Jeong Ho Chun, Seoul (KR); Jae Seon Lee, Seoul (KR); Seungchul Lee, Pohang-si (KR); Gyu Won Kim, Pohang-si (KR)

(73) Assignees: THE CATHOLIC UNIVERSITY OF KOREA INDUSTRY-ACADEMIC COOPERATION FOUNDATION, Seoul (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 308 days.

(21) Appl. No.: 18/021,470

(22) PCT Filed: Nov. 25, 2021

(86) PCT No.: PCT/KR2021/017471
§ 371 (c)(1),
(2) Date: Feb. 15, 2023

(87) PCT Pub. No.: WO2022/131607
PCT Pub. Date: Jun. 23, 2022

(65) Prior Publication Data
US 2023/0334882 A1 Oct. 19, 2023

(30) Foreign Application Priority Data

Dec. 14, 2020 (KR) .................... 10-2020-0174709

(51) Int. Cl.
*G06V 20/69* (2022.01)
*G06V 10/774* (2022.01)
*G06V 10/776* (2022.01)

(52) U.S. Cl.
CPC .......... *G06V 20/695* (2022.01); *G06V 10/774* (2022.01); *G06V 10/776* (2022.01); *G06V 20/698* (2022.01)

(58) Field of Classification Search
CPC .. G06V 20/695; G06V 10/774; G06V 10/776; G06V 20/698; G06V 10/32;
(Continued)

(56) References Cited

FOREIGN PATENT DOCUMENTS

KR 1020140067604 A 6/2014
KR 1020190058036 A 5/2019
(Continued)

OTHER PUBLICATIONS

"Jason Brownlee, How to Manually Scale Image Pixel Data for Deep Learning, Jul. 2019, Deep Learning for Computer Vision, Machinelearningmastery.com" (Year: 2019).*
(Continued)

*Primary Examiner* — Chineyere Wills-Burns
*Assistant Examiner* — Phuong Hau Cai
(74) *Attorney, Agent, or Firm* — Harness, Dickey & Pierce, P.L.C.

(57) ABSTRACT

The present disclosure relates to a cell selection apparatus and method and, in particular, may provide an apparatus that classifies cells by using artificial intelligence, on the basis of the homogeneity of cells from an image pre-processed from image data obtained by capturing images of cells, and marks parts that have an important influence on the classification results, thereby increasing the accuracy of cell selection. In addition, a reliable selection basis can be provided by visualizing the basis for cell selection.

10 Claims, 11 Drawing Sheets

(58) Field of Classification Search
CPC .. G06V 10/82; G06V 10/20; G06F 18/24155; G06F 18/2413; G06N 20/00; G06T 7/0012
See application file for complete search history.

(56) References Cited

FOREIGN PATENT DOCUMENTS

| | | |
|---|---|---|
| KR | 1020190105180 A | 9/2019 |
| KR | 1020190114241 A | 10/2019 |
| KR | 1020200080626 A | 7/2020 |

OTHER PUBLICATIONS

"Isabella Lindgren, Transformation, Scaling and Normalization, Jul. 2019, Medium.com" (Year: 2019).*

"Mahbub Hussain et. al., A Study on CNN Transfer Learning for Image Classification, Aug. 2018, Advances in Intelligent Systems and Computing AISC, vol. 840" (Year: 2018).*

"Maher Ibrahim Sameen et. al., Application of Convolutional Neural Networks Featuring Bayesian Optimization for Landslide Susceptibility Assessment, Mar. 2020, CATENA, vol. 186" (Year: 2020).*

"Min Sung Kim et. al., Homogeneity Evaluation of Mesenchymal Stem Cells Based on Electrotaxis Analysis, Aug. 2017, Scientific Reports, 7, Article No. 9582" (Year: 2017).*

"Andrius Vabalas et. al., Machine Learning Algorithm Validation with a Limited Sample Size, Nov. 2019, Plos One Journals" (Year: 2019).*

"G. Nebe-Von Caron et. al., Analysis of Bacterial Function by Multi-Colour Fluorescence Flow Cytometry and Single Cell Sorting, Sep. 2000, Journal of Microbiological Methods, vol. 42, Issue 1, pp. 97-114" (Year: 2000).*

"Sinno Jialin Pan, Transfer Learning, 2014, Book: Data Classification, 1st Edition, Chapman and Hall/CRC, Chapter 21" (Year: 2014).*

"Alexander Kensert et. al., Transfer Learning with Deep Convolutional Neural Networks for Classifying Cellular Morphological Changes, 2019, SLAS Discovery 2019, vol. 24[4], pp. 466-475" (Year: 2019).*

"M. Khalid Khan Niazi et. al., Computer-Assisted Bladder Cancer Grading: alpha-shapes for Color Space Decomposition, 2016, Proceedings vol. 9791, Medical Imaging 2016: Digital Pathology, 979107" (Year: 2016).*

International Search Report (English and Korean) and Written Opinion of the ISA (Korean) issued in PCT/KR2021/017471, mailed Mar. 7, 2022; ISA/KR.

\* cited by examiner

CELL SELECTION APPARATUS AND METHOD

CROSS-REFERENCE TO RELATED APPLICATIONS

The instant patent application is a U.S. National Phase Application under 35 U.S.C. 371 of International Application No. PCT/KR2021/017471, filed on Nov. 25, 2021, which claims the benefit of Korean Patent Application No. 10-2020-0174709, filed on Dec. 14, 2020. The entire disclosures of the above applications are herein incorporated by reference. The present patent application claims priority to other applications to be filed in other countries, the disclosures of which are also incorporated by reference herein in their entireties.

TECHNICAL FIELD

The present embodiments provide a cell selection device and method.

BACKGROUND ART

Various attempts are being made to apply image analysis technology using artificial neural networks to images and pathological tissue images in the medical field as such image analysis technology advances. In particular, artificial intelligence methods for recognizing patterns from images using such an artificial intelligence-based analysis method and performing training and selection are being applied to various medical fields including radiology.

Recently, as research on stem cells progresses and many stem cell sources are developed, cell therapeutics using stem cells are also developed and used clinically. However, even stem cells produced by the same standardized protocol may show differences in proliferation, differentiation, and efficacy depending on the cell sources. Therefore, stem cell therapeutics have limitations in efficacy control and evaluation. Further, analysis of individual cells may consume a lot of money and time, and the analyzed results and actual clinical results may be mismatched in many cases.

Therefore, in terms of practical use of stem cells, it is very critical to select functional stem cells and evaluate whether the differentiation result of the selected stem cells and the efficacy as a cell therapeutic match well. Therefore, there is a need for a cell selection technology using artificial intelligence that may lay a groundbreaking foundation in the field of cell therapeutics production using stem cells.

DETAILED DESCRIPTION OF THE INVENTION

Technical Problem

In the foregoing background, the present embodiments may provide a cell selection device and method capable of classifying cells based on their homogeneity by artificial intelligence.

Technical Solution

To achieve the above-described objectives, in an aspect, the present embodiments provide a cell selection device, comprising a pre-processing unit adjusting a size of a cell image extracted from image data obtained by capturing a cell into a preset size, converting the resized cell image into an HSV color space (hue, saturation, value model) to correct a brightness value, and normalizing a pixel value to generate training data, a model generation unit generating a second learning model using transfer learning from a pre-trained first learning model, a cell classification unit determining a homogeneity of the cell using the second learning model from the cell image and classifying into a positive cell and a negative cell based on the homogeneity, and a visualization unit marking a portion serving as a classification reference on the cell image based on a result of the classification and outputting it.

In another aspect, the present embodiments provide a cell selection method, comprising a pre-processing step adjusting a size of a cell image extracted from image data obtained by capturing a cell into a preset size, converting the resized cell image into an HSV color space to correct a brightness value, and normalizing a pixel value to generate training data, a model generation step generating a second learning model using transfer learning from a pre-trained first learning model, a cell classification step determining a homogeneity of the cell using the second learning model from the cell image and classifying into a positive cell and a negative cell based on the homogeneity, and a visualization step marking a portion serving as a classification reference on the cell image based on a result of the classification and outputting it.

Advantageous Effects

According to the present embodiments, there may be provided a cell selection device and method capable of classifying cells based on their homogeneity by artificial intelligence.

MODE FOR CARRYING OUT THE INVENTION

The disclosure relates to a cell selection device and method.

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

In the disclosure, in vivo test is a test in the living body and may generally mean a biochemical or biological experiment performed directly in a living cell. For example, the in vivo test may be a case of conducting a test on a live animal, such as a rat, rabbit, or dog.

Hereinafter, embodiments of the disclosure are described in detail with reference to the accompanying drawings.

Figure 1:
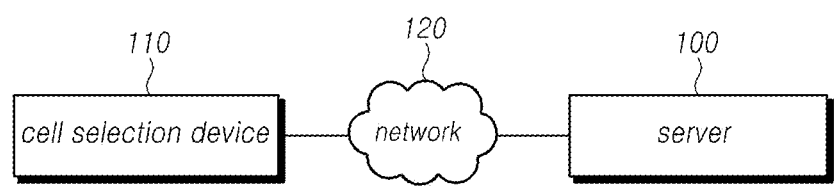
FIG. 1 is a view exemplarily illustrating a configuration of a system to which the disclosure may apply.

FIG. 1 is a view exemplarily illustrating a configuration of a system to which the disclosure may apply.

Referring to FIG. 1, the disclosure relates to a system that provides a cell selection method, and may be implemented as a cell selection device 110 and a server 100.

The cell selection device 110 may include a general PC, such as a general desktop or laptop computer, and may include a mobile terminal, such as a smartphone, a tablet PC, a personal digital assistant (PDA), and a mobile communication terminal, but without limitations thereto, should be broadly interpreted as any electronic device capable of communicating with the server 100.

The server 100 hardware-wise has the same configuration as a conventional web server or web application server or WAP server. However, the test control device 100 may software-wise be implemented through any language, such as C, C++, Java, PHP, .Net, Python, Ruby, and may include program modules that perform various functions.

Further, the server 100 may be connected with a plurality of unspecified clients (including the device 110) and/or other servers through a network. Thus, the server 100 may be a computer system that receives a task performing request from a client or another server and derives and provides a result of the task, or computer software (server program) installed for such a computer system.

The server 100 should be understood as a concept that encompasses a series of application programs operated on the server 100 in addition to the above-described server programs and, in some case, various databases established inside or outside.

Here, the database may mean a collection of data in which data, such as information, is structured and managed for the purpose of being used by the server or other devices, or may mean a storage medium storing such data collection.

Further, such a database may include a plurality of databases classified according to a data structuring scheme, management scheme, type, and the like. In some cases, the database may include a database management system (DBMS), which is software that allows information or data to be added, corrected, or deleted.

Further, the server 100 may store and manage various types of information and data in a database. Here, the database may be implemented inside or outside the server 100.

Further, the server 100 may be implemented by way of a server program that is provided in various ways according to operating systems, such as DOS, Windows, Linux, UNIX, and Macintosh on general server hardware and, as a representative examples, may use a website used in the Windows environment or Internet information server (IIS), and Apache, Nginx, or Light HTTP used in the Unix environment.

Meanwhile, the network 120 is a network that connects the server 100 and the cell selection device 110 and may be a closed network 120, such as local area network (LAN) or wide area network (WAN), or an open network, such as the Internet. The Internet may mean a global open computer network structure that provides the TCP/IP protocol and several services present on the higher layer, i.e., hypertext transfer protocol (HTTP), Telnet, file transfer protocol (FTP), domain name system (DNS), simple mail transfer protocol (SMTP), simple network management protocol (SNMP), network file service (NFS), or network information service (NIS).

The cell selection device and method briefly described above are described below in more detail.

Figure 2:
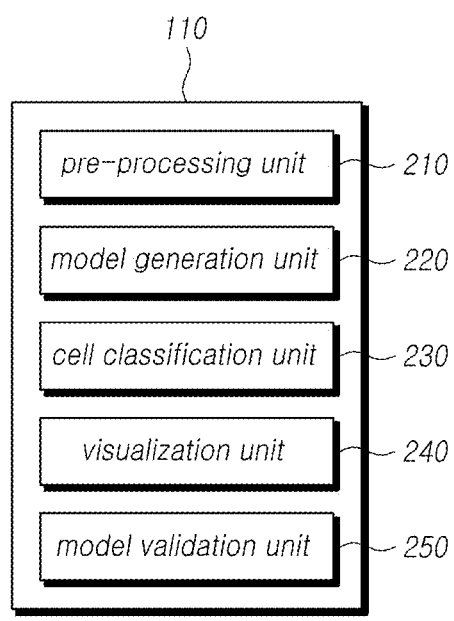
FIG. 2 is a view illustrating a configuration of a cell selection device according to an embodiment of the disclosure.

FIG. 2 is a view illustrating a configuration of a cell selection device according to an embodiment of the disclosure.

Referring to FIG. 2, according to an embodiment of the disclosure, there is provided a cell selection device 110 comprising a pre-processing unit 210 adjusting a size of a cell image extracted from image data obtained by capturing a cell into a preset size, converting the resized cell image into an HSV color space (hue, saturation, value model) to correct a brightness value, and normalizing a pixel value to generate training data, a model generation unit 220 generating a second learning model using transfer learning from a pre-trained first learning model, a cell classification unit 230 determining a homogeneity of the cell using the second learning model from the cell image and classifying into a positive cell and a negative cell based on the homogeneity, and a visualization unit 240 marking a portion serving as a classification reference on the cell image based on a result of the classification and outputting it.

The pre-processing unit 210 may adjust the size of the cell image extracted from the cell-captured image data to the preset size. For example, the pre-processing unit 210 may obtain a cell image using an automatic optical microscope capture system. Further, the pre-processing unit 210 may adjust the size of the obtained image into the preset size to prevent a geometric increase in learning time due to a large size.

The pre-processing unit 210 may convert the cell image into the HSV color space (hue, saturation, value model) to correct the brightness value. For example, the pre-processing unit 210 may remove a preset value or more based on the brightness value in the cell image converted into the HSV color space and correct the average to match a specific value. Thus, the pre-processing unit 210 may enable detailed cell observation by constantly adjusting the brightness of the image obtained from the automatic capture system.

The pre-processing unit 210 may generate training data by normalizing pixel values. For example, the pre-processing unit 210 may limit the range of training data by normalizing the pixel values of the cell image between 0 and 1. For example, the pre-processing unit 210 may normalize each pixel value by subtracting the average and dividing by the standard deviation value. Alternatively, the pre-processing unit 210 may normalize each pixel value by reducing by the minimum pixel value and then dividing by the difference between the maximum and minimum pixel values. This allows the data of each dimension to have a value in the same range, accelerating training and reducing the likelihood of falling into a local optimum state.

The model generation unit 220 may generate the second learning model using transfer learning from the pre-trained first learning model. As an example, the model generation unit 220 may train the first learning model, which is pre-trained with massive images, with cell images using a transfer learning scheme. For example, the pre-trained first learning model used for transfer learning may have a large-size convolutional neural network (CNN) structure. Specifically, the model generation unit 220 may generate the second learning model by fixing the weights of the first learning model except for the last layer (fully connected layer) from the first learning model and adjusting the weights of the last layer. Further, the model generation unit 220 may set hyperparameters of the second learning model using a Bayesian optimization algorithm.

The cell classification unit 230 may determine the homogeneity of the cells using the second learning model from the cell image and classify into positive cells and negative cells based on the homogeneity. As an example, the cell classification unit 230 may determine the homogeneity of cells by the number of specific single cells inferred as the functional cells included in the cell image.

The visualization unit 240 may mark the portion, serving as the classification reference, on the cell image based on the result of classification and output it. As an example, the visualization unit 240 may mark the portion which is the classification reference using at least one algorithm among a plurality of visualization algorithms based on the result of classification by the second learning model and determine the suitability of the second learning model. For example, the visualization unit 240 may mark the portion referenced by the second learning model to classify into positive cells and negative cells using the visualization algorithm.

The model validation unit 250 may perform additional validation to set the hyperparameter of the second learning model. For example, the model validation unit 250 may perform a validation process to divide the training data into K groups and extract one of the groups and use it as a validation set while using the other groups as training sets. Further, the model validation unit 250 may perform cross validation on the second learning model based on the values resultant from repeating the validation process K times.

Figure 3:
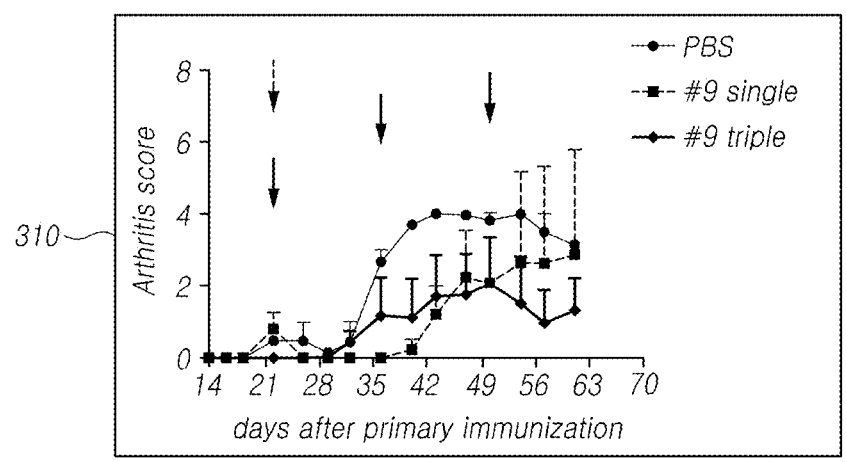
FIG. 3 is a view exemplarily illustrating two cell sources showing a difference in disease amelioration function according to an embodiment of the disclosure.
Figure 3:
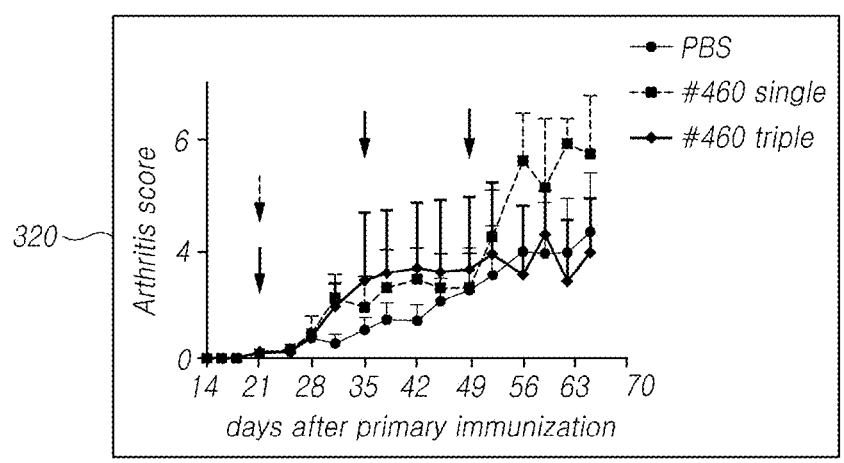

FIG. 3 is a view exemplarily illustrating two cell sources showing a difference in disease amelioration function according to an embodiment of the disclosure.

Referring to FIG. 3, two cell sources showing a difference in disease amelioration function of rheumatic disease may be described. For example, the pre-processing unit 210 may obtain an image using an automatic optical microscope capture system from two human neural crest derived stem cells (hNTSCs) cell sources that show a difference in the function (immune modulation effect) of mitigating rheumatic disease, a representative autoimmune disease, through an in vivo test.

For example, each cell may identify its therapeutic effect on rheumatism through the test. In the test, after inducing collagen induced arthritis (CIA) in the mouse leg, the degree of symptoms (arthritis score) is measured for each individual, and the rheumatoid treatment effect of hNTSCs may be identified by the day. As a result of the test, for donor #9 310, it may be identified that the symptoms are alleviated as compared to the control group (PBS) when administration is repeated three times. In contrast, for donor #460 320, it may be identified that the symptoms become more severe than the control group (PBS). Therefore, it is possible to identify that there is a difference in efficacy as a therapeutic for each cell line.

Figure 4:
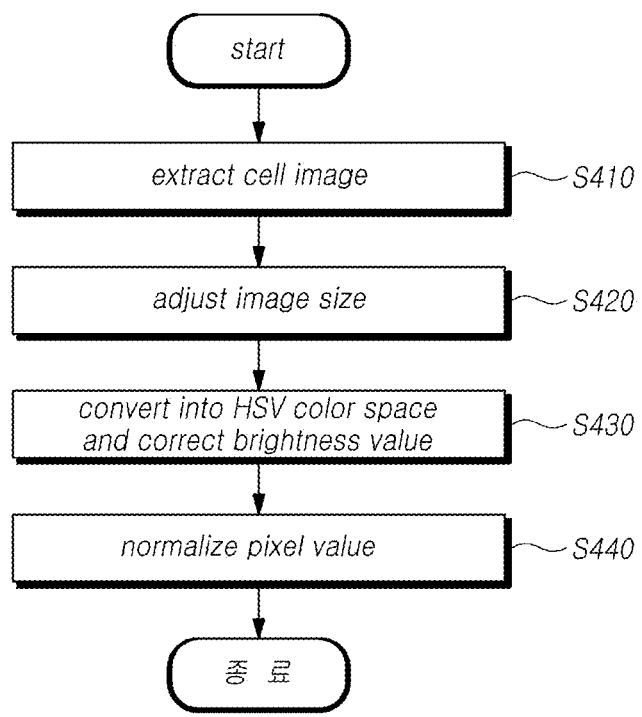
FIG. 4 is a view exemplarily illustrating operations of a pre-processing unit in a cell selection device according to an embodiment of the disclosure.

FIG. 4 is a view exemplarily illustrating operations of a pre-processing unit in a cell selection device according to an embodiment of the disclosure.

Referring to FIG. 4, according to an embodiment of the disclosure, the pre-processing unit 210 of the cell selection device may extract a cell image from image data captured for cells (S410). Here, the cells are a human neural crest derived stem cells (hNTSCs) cell source and may be cells that show differences in function of mitigating rheumatic diseases, which are autoimmune diseases (immune modulation effect). Specifically, the cells may be obtained by securing a sufficient number of cells by culturing in an alpha-MEM (10% FBS, 1% AA) medium, 30° C., 5% CO2 incubator and then culturing $3 \times 10^4$ cells per well in a 6-well plate. Further, the pre-processing unit 210 may capture the cells using an automatic optical microscope capture system. The automatic optical microscope capture system may be a live cell imaging device. However, the capture system is an example, and is not limited thereto.

The pre-processing unit 210 may adjust the size of the cell image to a preset size (S420). For example, the pre-processing unit 210 may adjust the size of the extracted cell image to a preset size of 226×306. This is intended for preventing a geometrical increase in the time of training the model when the image size is large. However, in the disclosure, the description is based on the size of 224×306, but is not limited thereto.

The pre-processing unit 210 may convert the cell image into the HSV color space (hue, saturation, value model) to correct the brightness value (S430). The HSV color space (hue, saturation, value model) is one method for representing colors and may be a scheme for arranging colors according to the method. For example, the pre-processing unit 210 may convert the cell image into an HSV color space in which a specific color is designated using coordinates of hue, saturation, and value.

For example, the pre-processing unit 210 may remove brightness values larger than or equal to a certain value from the converted HSV color space and calibrate the average of the brightness values to 190. However, the average of the brightness values is 190 as an example, but is not limited thereto. The pre-processing unit 210 may prevent model performance degradation that occurs when the brightness of the image obtained from the automatic capture system is not constant, by correcting the brightness values.

The pre-processing unit 210 may generate training data by normalizing pixel values (S440). For example, the pre-processing unit 210 may generate training data by normalizing the pixel values between 0 and 1. As a specific example, the pre-processing unit 210 may convert the pixel values of the image having values between 0 and 255 into values between 0 and 1. The pre-processing unit 210 may normalize each pixel value with the value obtained by reducing by the minimum pixel value and then dividing by the difference between the maximum and minimum pixel values. Alternatively, the pre-processing unit 210 may normalize each pixel value with the value obtained by reducing each pixel value by the average pixel value, and then dividing by the standard deviation of the pixel value. In other words, normalization may speed up training and prevent falling into a local optimum (minimum) by limiting the data range to a range desired by the user.

Further, the training data generated by the pre-processing unit 210 may include a training dataset, a validation dataset, and a test dataset. Here, the training dataset may be actual data used to create the model. The validation dataset may be data for evaluating the performance of the model made with training data as to whether it predicts well. Further, the test dataset may be data necessary to identify whether the finally selected model is a model that may be generalized with sufficient accuracy. The accuracy predicted by the model in the absence of labels may be measured as the final accuracy. As a specific example, the training data generated by the pre-processing unit 210 may be constituted of two hNTSCs cell sources (positive 1 cell line/negative 1 cell line) for performing model training and evaluation and eight hNTSCs cell sources (positive 3 cell lines/negative 5 cell lines) not used for training to identify the regularization performance of the model.

Figure 5:
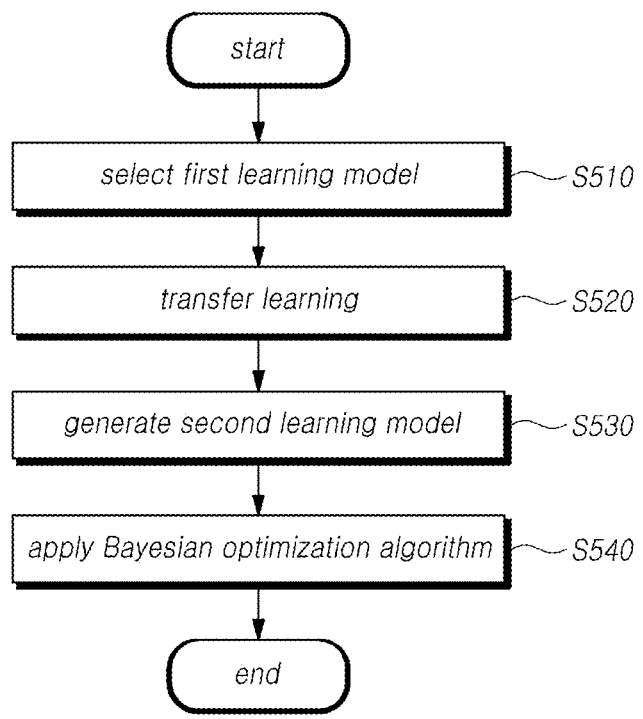
FIG. 5 is a view exemplarily illustrating operations of a model generation unit in a cell selection device according to an embodiment of the disclosure.

FIG. 5 is a view exemplarily illustrating operations of a model generation unit in a cell selection device according to an embodiment of the disclosure.

Referring to FIG. 5, according to an embodiment of the disclosure, the model generation unit 220 of the cell selection device may select a pre-trained first learning model (S510). For example, the model generation unit 220 may use a model pre-trained with large-sized data as the first learning model that is a base model to be used for transfer learning. In this case, the pre-trained model may be a model built using a convolutional neural network (CNN) as a machine learning model including a feature extraction layer and a classification layer. Here, the feature extraction layer may be a layer that extracts a feature map or an activation map from the image input through a convolution operation. Further, the classification layer may be a layer that classifies image categories by compiling feature maps through an operation, such as Softmax. However, the convolutional neural network is an example and may be a deep hierarchical network (DHN), convolutional deep belief network (CDBN), deconvolutional deep network (DDN), recurrent neural network (RNN), or generative adversarial network (GAN). Without limitations thereto, the disclosure may use various neural network algorithms available currently or in the future as the first learning model.

For example, the model generation unit 220 may use five pre-trained models, such as DenseNet121, InceptionV3, ResNet50V2, VGG19, and Xception, among the representative algorithms from the image recognition competition ImageNet Large Scale Visual Recognition Challenge (ILSVRC), as the first learning model.

The model generation unit 220 may perform transfer learning on the pre-trained first learning model (S520). The transfer learning may mean using some capabilities of a model learned in a specific field to train a model used in a similar or completely new field. For example, the model generation unit 220 may train only the last layer while fixing, and not training, feature extraction layers other than the last layer (fully connected layer) of the first learning model. For example, the model generation unit 220 may fix the weights of the pre-trained first learning model not to be trained and may replace the last layer with the layer newly generated based on the number of classifications to be output and the number of input data of the last layer (fully connected layer).

As another example, the model generation unit 220 may finely adjust the first learning model based on the similarity and the size of training data. As a specific example, when the size of training data and the similarity are small, the model generation unit 220 may further include some layers of the feature extraction layers of the first learning model and train them. Or, when the size of the training data is large, and the similarity is small, the model generation unit 220 may newly train them only with the parameters and the structure of the first learning model. Or, for the data in which the size of the training data is small, but the similarity is large, the model generation unit 220 may train only the last layer of the first learning model.

The model generation unit 220 may generate the second learning model using transfer learning from the first learning model (S530). For example, the model generation unit 220 may generate the second learning model by training the pre-trained first learning model according to the degree of transfer learning determined based on the size of the training data and the similarity.

The model generation unit 220 may optimize the hyperparameter by applying the Bayesian optimization algorithm to the second learning model (S540). Here, the hyperparameter may refer to a variable that is set directly by people with a priori knowledge or automatically set through an external model mechanism, such as learning progress rate or regularization variable, rather than the primary variable that need to be tuned or optimized through training. Further, the optimization of the hyperparameter may mean discovery of a parameter to reduce the loss function as much as possible (or parameter to maximize or minimize the function value of the objective function), i.e., discovery of the optimal weight to minimize errors. Therefore, the setting of the hyperparameter may greatly affect the learning rate and performance of the model. For example, the hyperparameter may be the learning rate, the number of hidden units, the regularization parameter, and the number of iterations of training, and the like.

The model generation unit 220 may use the batch size, learning rate, dropout rate, and number of dense neurons of the second learning model as hyperparameters and optimize them by applying the Bayesian optimization algorithm. Here, the Bayesian optimization algorithm may be an algorithm that discovers an optimal hyperparameter combination by creating an alternative model that performs probabilistic estimation on the objective function and the corresponding hyperparameter pair and sequentially updating the model through evaluation.

Figure 6:
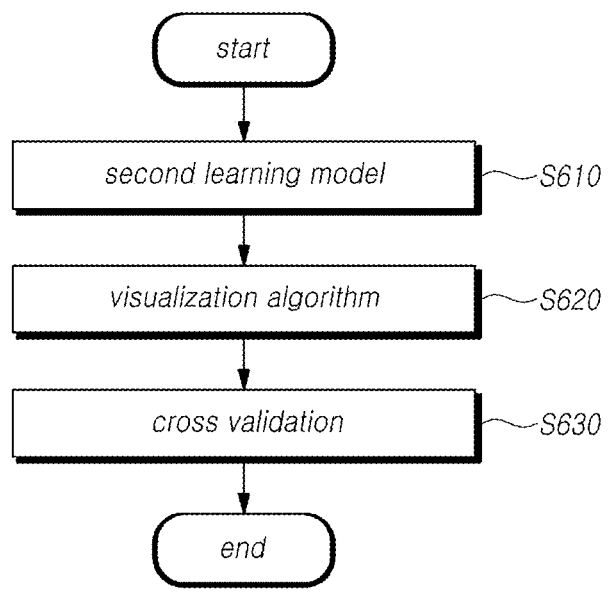
FIG. 6 is a view exemplarily illustrating an operation of classifying cells and validating a model by a cell selection device according to an embodiment of the disclosure.

FIG. 6 is a view exemplarily illustrating an operation of classifying cells and validating a model by a cell selection device according to an embodiment of the disclosure.

Referring to FIG. 6, according to an embodiment of the disclosure, the cell classification unit 230 of the cell selection device may classify cells according to the second learning model (S610). For example, the cell classification unit 230 may determine the homogeneity of the cells using the second learning model from the cell image and classify into positive cells and negative cells. In this case, the homogeneity of cells may be determined by the number of specific single cells inferred as the functional cells included in the cell image.

The visualization unit 240 may mark the portion, serving as the classification reference, on the cell image based on the result of classification and output it (S620). For example, the visualization unit 240 may mark the portion that is the classification reference using at least one of a plurality of visualization algorithms. For example, the plurality of visualization algorithms used by the visualization unit 240 may be grad-CAM, visualbackprop, or layer-wise relevance propagation (LRP).

Further, the visualization unit 240 may identify the portion referenced by the second learning model to classify into positive cells and negative cells using the visualization algorithm. In other words, the visualization unit 240 may be a reference for determining suitability of the second learning model.

The model validation unit 250 may perform additional validation as to whether the trained model properly looks at and determine the cells. For example, the model validation unit 250 may provide indexes to evaluate and predict the performance of the model by performing cross validation on the second learning model. The cross validation may allow the system to evaluate the performance of the model even with a small amount of data by using some of the collected data as input data for validating the model, rather than using all of the data to generate the learning model. As a specific example, the cross validation may be holdout cross validation, K-fold cross validation, and leave-p-out cross validation.

Figure 7:
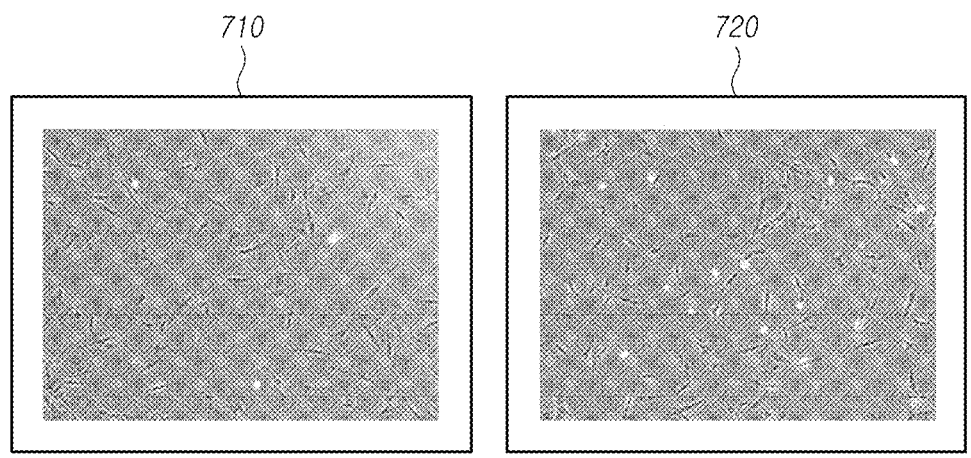
FIG. 7 is a view illustrating an example of identifying the performance of a model from two cell sources according to an embodiment of the disclosure.

FIG. 7 is a view illustrating an example of identifying the performance of a model from two cell sources according to an embodiment of the disclosure.

Referring to FIG. 7, a result of classifying into positive cells and negative cells using the second learning model may be described. For example, the visualization unit 240 may identify that each cell is being paid attention to using the visualization algorithm and identify the reliability of the model using the same. For example, the result of classification by the cell classification unit 230 may identify that the negative cell group 710 has a smaller number of noteworthy cells while the positive cell group 720 has a larger number of noteworthy cells. Accordingly, it may be identified that the cell classification unit 230 classifies cells based on the homogeneity of specific cells inferred as functional cells.

Figure 8:
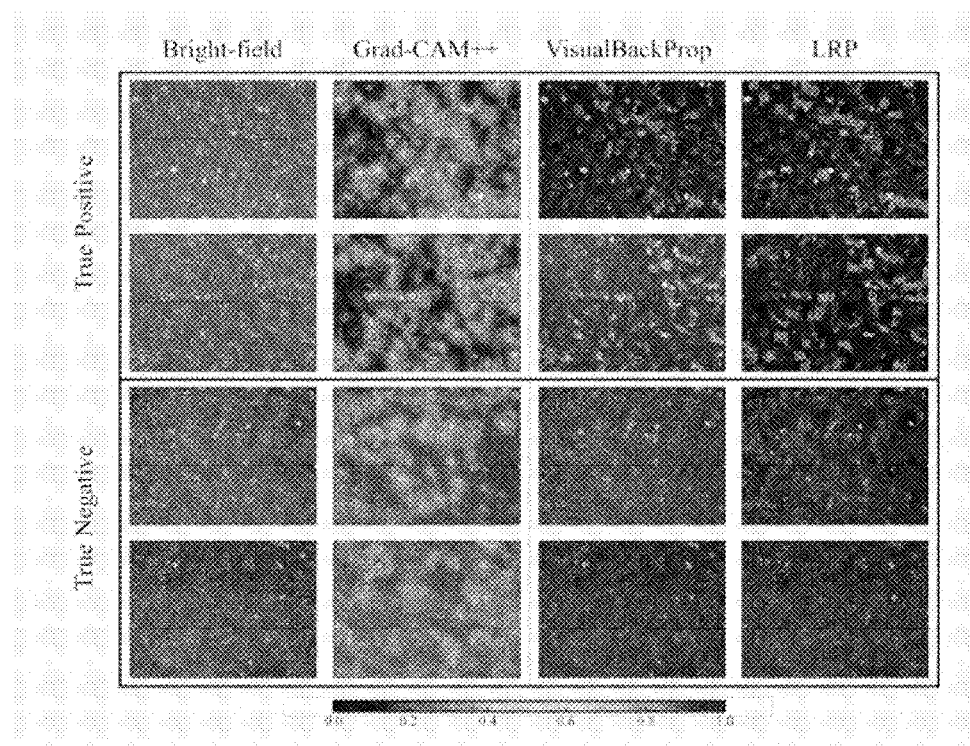
FIG. 8 is a view exemplarily illustrating model analysis using a visualization algorithm in a cell selection device according to an embodiment of the disclosure.

FIG. 8 is a view exemplarily illustrating model analysis using a visualization algorithm in a cell selection device according to an embodiment of the disclosure.

Referring to FIG. 8, according to an embodiment of the disclosure, the visualization unit 240 of the cell selection device may mark the portion having a critical influence on the result of classification using at least one of a plurality of visualization algorithms. For example, in the marking result by the visualization unit 240, it may be identified that a lot of attention is paid to specific cells in the case of true positive at the top and significantly less attention is paid to the cells in the case of true negative at the bottom. Further, the visualization unit 240 may perform additional validation as to whether the second learning model properly classifies cells by displaying the model classification result by applying the visualization algorithm.

Further, the display result by the visualization unit 240 may be each result of applying a bright field of an optical microscope and visualization algorithms, such as gradient-weighted class activation mapping++ (grad-CAM++), visualbackprop, and layer-wise relevance propagation (LRP). For example, the visualization unit 240 may display the classification result of the model by applying the gradient-weighted class activation mapping++ (grad-CAM++) algorithm. Specifically, the visualization unit 240 may calculate the gradient through backpropagation using the grad-CAM++ algorithm and obtain a localization map that marks a critical area in the image using the gradient information going to the final layer. Here, the localization map may be obtained with the nonlinear function ReLU after linearly combining the feature map from the final layer and the weight of the gradient. The visualization unit 240 may display the portion that has a critical influence on the classification result on the image using the feature map of the final layer.

As another example, the visualization unit 240 may display the classification result of the model by applying a layer-wise relevance propagation (LRP) algorithm. The visualization unit 240 may calculate a relevance score of each dimension of the d-dimensional input x for a random sample x in the model using the LRP algorithm. Specifically, the visualization unit 240 may calculate the relevance score ($R_i$) of each pixel of the input sample to obtain the output f(x) using the LRP algorithm. The visualization unit 240 may determine the portion having a significant effect on the classification result by displaying a color according to the calculated relevance score of each pixel.

Figure 9:
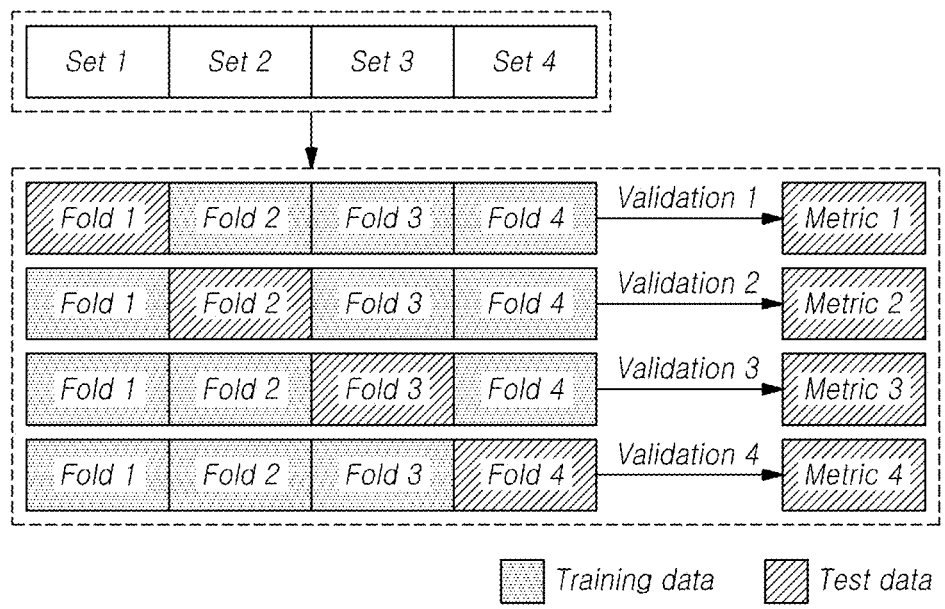
FIG. 9 is a view illustrating an example of cross validation in a cell selection device according to an embodiment of the disclosure.

FIG. 9 is a view illustrating an example of cross validation in a cell selection device according to an embodiment of the disclosure.

Referring to FIG. 9, according to an embodiment of the disclosure, the model validation unit 250 of the cell selection device may perform cross-validation on the second learning model. For example, the model validation unit 250 may perform a validation process to divide the training data into K groups and extract one of the groups and use it as a validation set while using the other groups as training sets. The model validation unit 250 may use the value resultant from repeating the validation process K times as the validation result value. For example, the model validation unit 250 may use a technique called 4 fold cross validation in the case where there is one cell donor for each class in the training data for model construction. Specifically, the model validation unit 250 may divide the limited training data into 4 groups at a ratio of 3:1 and may perform the validation process using one group among the four groups as a validation set while using the remaining three groups as a training set. In other words, the model validation unit 250 may perform training and validation a total of four times based on the training data. However, the 4 fold cross validation is an example, and the cross validation method is not limited thereto.

A cell selection method that may be performed by the cell selection device described above in connection with FIGS. 1 to 9 is described below.

Figure 10:
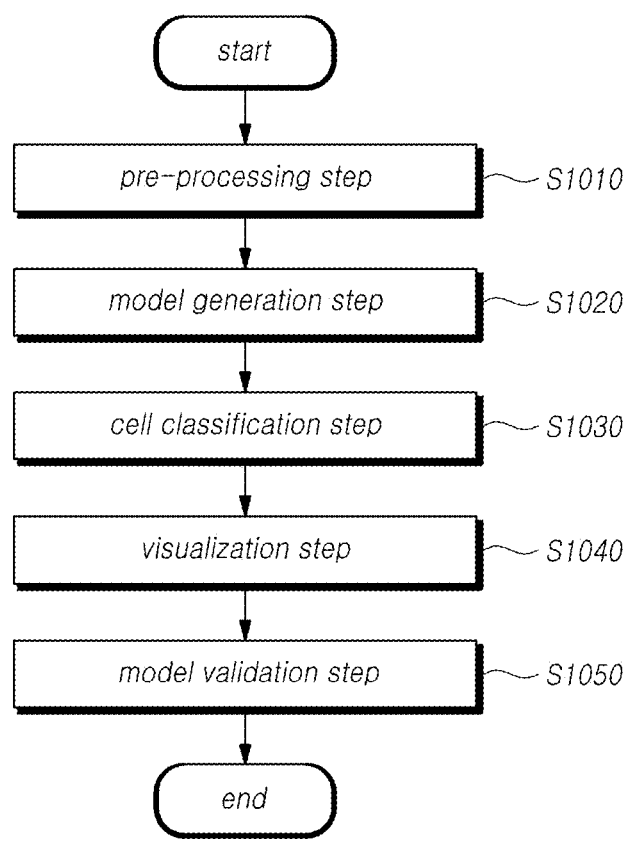
FIG. 10 is a flowchart illustrating a cell selection method according to another embodiment of the disclosure.

FIG. 10 is a flowchart illustrating a cell selection method according to another embodiment of the disclosure.

Referring to FIG. 10, the cell selection method for the disclosure may include a pre-processing step (S1010). As an example, the cell selection device may adjust the size of the cell image extracted from the cell-captured image data to the preset size. Further, the cell selection device may convert the cell image into an HSV color space (hue, saturation, value model) and remove a preset value or more based on the brightness value in the converted cell image and correct the average to match a specific value. Further, the cell selection device may generate training data by normalizing pixel values. For example, the cell selection device may limit the range of training data by normalizing the pixel values of the cell image between 0 and 1. In this case, the training data may be calculated as the value obtained by reducing by the minimum pixel value and then dividing by the difference between the maximum and minimum pixel values.

The cell selection method may include a model generation step (S1020). As an example, the cell selection device may generate the second learning model using transfer learning from the pre-trained first learning model. For example, the cell selection device may generate the second learning model by fixing the weights of the first learning model except for the last layer (fully connected layer) from the first learning model and adjusting the weights of the last layer. As another example, the cell selection device may set hyper parameters of the second learning model using a Bayesian optimization algorithm.

The cell selection method may include a cell classification step (S1030). For example, the cell selection device may determine the homogeneity of the cells using the second learning model from the cell image and classify into positive cells and negative cells based on the homogeneity. The homogeneity of cells may be determined by the number of specific single cells inferred as the functional cells included in the cell image.

The cell selection method may include a visualization step (S1040). As an example, the cell selection device may mark the portion, serving as the classification reference, on the cell image based on the result of classification and output it. For example, the cell selection device may mark the portion which is the classification reference using at least one algorithm among a plurality of visualization algorithms based on the result of classification by the second learning model and determine the suitability of the second learning model.

The cell selection method may further include a model validation step (S1050). For example, the cell selection device may perform a validation process to divide the training data into K groups and extract one of the groups and use it as a validation set while using the other groups as training sets. Further, the cell selection device may perform validation as to whether the second learning model is a model that may be generalized with sufficient accuracy as the validation result value by averaging the values resultant from repeating the validation process K times.

Although the cell selection method according to an embodiment of the disclosure is described as being performed in a process as shown in FIG. 10, this is merely for convenience of description and, without departing from the essential concept of the disclosure, the steps may be performed in different orders, two or more steps may be integrated, or one step may be separated into two or more steps depending on implementations.

Figure 11:
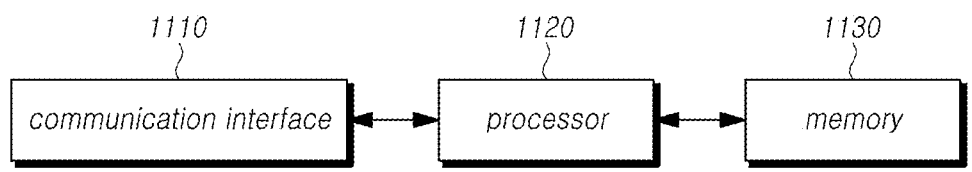
FIG. 11 is a block diagram illustrating a cell selection device according to an embodiment of the disclosure.

FIG. 11 is a block diagram illustrating a cell selection device according to an embodiment.

Referring to FIG. 11, according to an embodiment, a cell selection device 110 includes a communication interface 1110 and a processor 1120. The cell selection device 110 may further include a memory 1130. Each component, communication interface 1110, processor 1120, and memory 1130 may be connected to each other through a communication bus. For example, the communication bus may include a circuit for connecting the components with one another and transferring communications (e.g., control messages and/or data) between the components.

The communication interface 1110 may obtain cell-captured image data from a server. Further, the communication interface 1110 may perform communication with an external device through wireless communication or wired communication.

The processor 1120 may perform at least one method described above in connection with FIGS. 1 to 10 or an algorithm corresponding to at least one method. The processor 1120 may be a data processing device implemented in hardware having a circuit having a physical structure for executing desired operations. For example, the desired operations may include code or instructions included in a program. For example, the data processing unit implemented in hardware may include a microprocessor, a central processing unit, a processor core, a multi-core processor, a multiprocessor, a neural processing unit (NPU), an application-specific integrated circuit (ASIC), or a field programmable gate array (FPGA).

Further, the processor 1120 may execute the program and may control the cell selection device 110. The program code executed by the processor 1120 may be stored in the memory 1130.

Information about the learning model including a neural network according to an embodiment of the disclosure may be stored in an internal memory of the processor 1120 or may be stored in an external memory, that is, the memory 1130. For example, the memory 1130 may store image data obtained by capturing cells obtained through the communication interface 1110. The memory 1130 may store an artificial intelligence model including a neural network. Further, the memory 1130 may store various information generated during processing by the processor 1120 and output information extracted by the processor 1120. The output information may be a neural network calculation result or a neural network test result. The memory 1130 may store the neural network learning result. The neural network learning result may be obtained from the cell selection device 110 or may be obtained from an external device. The neural network learning result may include weight and bias values. Further, the memory 1130 may store various data and programs. The memory 1130 may include a volatile memory or a non-volatile memory. The memory 1130 may include a mass storage medium, such as a hard disk and the like, and may store various data.

Although it is described above that all of the components are combined into one or are operated in combination, embodiments of the disclosure are not limited thereto. One or more of the components may be selectively combined and operated as long as it falls within the scope of the objects of the disclosure. Further, although all of the components may be implemented in their respective independent hardware components, all or some of the components may be selectively combined to be implemented in a computer program with program modules performing all or some of the functions combined in one or more hardware components and recorded in a computer-readable medium. The computer-readable medium may include programming commands, data files, or data structures, alone or in combinations thereof. The programming commands recorded in the medium may be specially designed and configured for the present invention or may be known and available to one of ordinary skill in the computer software-related art. Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands. Examples of the programming commands may include, but are not limited to, high-level language codes executable by a computer using, e.g., an interpreter, as well as machine language codes as created by a compiler. The above-described hardware devices may be configured to operate as one or more software modules to perform operations according to an embodiment of the present invention, or the software modules may be configured to operate as one or more hardware modules to perform the operations.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention. This work was supported by the Priority Research Centers Program through the National Research Foundation of Korea (NRF) funded by the Ministry of Education (2020R1A6A1A03047902). This research was supported by the Ministry of Trade, Industry and Energy (MOTIE) (Development of Meta Soft Organ Module Manufacturing Technology without Immunity Rejection and Module Assembly Robot System, 20012378), Korea.

The invention claimed is:

1. A cell selection device, comprising:
a pre-processing unit adjusting a size of a cell image extracted from image data obtained by capturing a cell into a preset size, converting the resized cell image into an HSV color space (hue, saturation, value model) to correct a brightness value, and normalizing a pixel value to generate training data;
a model generation unit generating a second learning model by performing transfer learning using at least two different pre-trained first learning models and combining outputs of the first learning models based on a similarity between the training data and the datasets of the first learning models;
a cell classification unit determining a homogeneity of the cell based on the number of specific single cells inferred as functional cells using the second learning model from the cell image and classifying the cell into a positive cell and a negative cell based on the homogeneity; and
a visualization unit marking a portion serving as a classification reference on the cell image based on a result of the classification by the second learning model and outputting the marked image to indicate a basis of the classification.

2. The cell selection device of claim 1, wherein the pre-processing unit removes a preset value or more with respect to the brightness value from the cell image converted in to the HSV color space and corrects an average to a specific value.

3. The cell selection device of claim 1, wherein the pre-processing unit normalizes the pixel value of the cell image between 0 and 1 to limit a range of the training data, and
wherein the training data is calculated as a value obtained by reducing each pixel value by a minimum value of the pixel value and then dividing by a difference between a maximum value and minimum value of the pixel value.

4. The cell selection device of claim 1, wherein the cell classification unit determines a homogeneity of the cell based on a number of specific single cells inferred as functional cells included in the cell image.

5. The cell selection device of claim 1, wherein the visualization unit marks the portion serving as the classification reference using at least one algorithm among a plurality of visualization algorithms based on a result of classification by the second learning model and determines suitability of the second learning model.

6. A cell selection method, comprising:
a pre-processing step adjusting a size of a cell image extracted from image data obtained by capturing a cell into a preset size, converting the resized cell image into an HSV color space (hue, saturation, value model) to correct a brightness value, and normalizing a pixel value to generate training data;
a model generation step generating a second learning model by performing transfer learning using at least two different pre-trained first learning models and combining outputs of the first learning models based on a similarity between the training data and the datasets of the first learning models;
a cell classification step determining a homogeneity of the cell based on the number of specific single cells inferred as functional cells using the second learning model from the cell image and classifying the cell into a positive cell and a negative cell based on the homogeneity; and
a visualization step marking a portion serving as a classification reference on the cell image based on a result of the classification by the second learning model and outputting the marked image to indicate a basis of the classification.

7. The cell selection method of claim 6, wherein the pre-processing step removes a preset value or more with respect to the brightness value from the cell image converted in to the HSV color space and corrects an average to a specific value.

8. The cell selection method of claim 6, wherein the pre-processing step normalizes the pixel value of the cell image between 0 and 1 to limit a range of the training data, and wherein the training data is calculated as a value obtained by reducing each pixel value by a minimum value of the pixel value and then dividing by a difference between a maximum value and minimum value of the pixel value.

9. The cell selection method of claim 6, wherein the cell classification step determines a homogeneity of the cell based on a number of specific single cells inferred as functional cells included in the cell image.

10. The cell selection method of claim 6, wherein the visualization step marks the portion serving as the classification reference using at least one algorithm among a plurality of visualization algorithms based on a result of classification by the second learning model and determines suitability of the second learning model.

\* \* \* \* \*